US011993253B2

(12) United States Patent
Watanabe et al.

(10) Patent No.: US 11,993,253 B2
(45) Date of Patent: May 28, 2024

(54) VEHICLE CONTROL DEVICE, VEHICLE CONTROL CENTER, AND PARKING ASSISTANCE SYSTEM

(71) Applicant: Hitachi Automotive Systems, Ltd., Hitachinaka (JP)

(72) Inventors: Katsuro Watanabe, Hitachinaka (JP); Shigenori Hayase, Hitachinaka (JP); Shunsuke Katoh, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 800 days.

(21) Appl. No.: 17/055,475

(22) PCT Filed: May 15, 2019

(86) PCT No.: PCT/JP2019/019219
§ 371 (c)(1),
(2) Date: Nov. 13, 2020

(87) PCT Pub. No.: WO2019/244517
PCT Pub. Date: Dec. 26, 2019

(65) Prior Publication Data
US 2021/0213938 A1    Jul. 15, 2021

(30) Foreign Application Priority Data
Jun. 18, 2018  (JP) ................. 2018-115303

(51) Int. Cl.
*B60W 30/06*    (2006.01)
*B60L 58/12*    (2019.01)
(Continued)

(52) U.S. Cl.
CPC ............. *B60W 30/06* (2013.01); *B60L 58/12* (2019.02); *B60W 50/0097* (2013.01);
(Continued)

(58) Field of Classification Search
CPC .. B60W 30/06; B60W 50/0097; B60W 50/14; B60W 2050/146; B60W 2510/244;
(Continued)

(56) References Cited

U.S. PATENT DOCUMENTS

2011/0213551 A1    9/2011  Shioda
2011/0246052 A1    10/2011 Zaitsu
(Continued)

FOREIGN PATENT DOCUMENTS

JP    2007-269109 A    10/2007
JP    2010-060505 A    3/2010
(Continued)

OTHER PUBLICATIONS

International Search Report with English translation and Written Opinion issued in corresponding application No. PCT/JP2019/019219 dated Sep. 10, 2019.
(Continued)

*Primary Examiner* — Peter D Nolan
*Assistant Examiner* — Wae L Louie
(74) *Attorney, Agent, or Firm* — Foley & Lardner LLP

(57) ABSTRACT

The present invention provides a vehicle control device capable of avoiding a problem due to insufficient energy remaining in a vehicle in a parking lot. The vehicle control device 100 includes a remaining energy amount calculation unit 110, a parking lot information acquisition unit 120, a prediction unit 130, a required energy amount calculation unit 140, and a parking determination unit 150. The remaining energy amount calculation unit 110 calculates a remaining amount of energy of a vehicle V. The parking lot information acquisition unit 120 acquires map information and other vehicles information of a parking lot. The prediction unit 130 predicts a traveling speed and a movement time of the vehicle V at the time of entry and exit. The required
(Continued)

energy amount calculation unit 140 calculates a required amount of energy. The parking determination unit 150 determines whether or not the vehicle V can be parked based on the remaining amount of energy and the required amount of energy.

10 Claims, 6 Drawing Sheets

(51) Int. Cl.
  *B60W 50/00* (2006.01)
  *B60W 50/14* (2020.01)
  *G08G 1/14* (2006.01)

(52) U.S. Cl.
  CPC ............... *B60W 50/14* (2013.01); *G08G 1/14* (2013.01); *B60W 2050/146* (2013.01); *B60W 2510/244* (2013.01); *B60W 2520/10* (2013.01); *B60W 2520/12* (2013.01)

(58) Field of Classification Search
  CPC .......... B60W 2520/10; B60W 2520/12; B60L 58/12
  See application file for complete search history.

(56) References Cited

U.S. PATENT DOCUMENTS

| | | | |
|---|---|---|---|
| 2017/0285654 A1 | 10/2017 | Nagai | |
| 2019/0168747 A1* | 6/2019 | Higashitani | B60W 30/06 |
| 2020/0062308 A1* | 2/2020 | Kim | G08G 1/168 |
| 2020/0298874 A1* | 9/2020 | Noguchi | B62D 15/0285 |
| 2020/0409361 A1* | 12/2020 | Herman | G01S 13/931 |
| 2021/0213938 A1* | 7/2021 | Watanabe | G08G 1/14 |
| 2022/0050143 A1* | 2/2022 | Maeda | B60L 53/305 |
| 2022/0063591 A1* | 3/2022 | Inoue | B60L 3/0046 |
| 2022/0063600 A1* | 3/2022 | Inoue | B60W 50/029 |
| 2022/0107194 A1* | 4/2022 | Hagström | G01C 21/3697 |
| 2022/0144251 A1* | 5/2022 | Hidaka | G08G 1/09 |
| 2022/0281340 A1* | 9/2022 | Lu | B60L 55/00 |
| 2023/0146620 A1* | 5/2023 | Hayase | G01S 15/931 |
| | | | 718/104 |
| 2023/0226922 A1* | 7/2023 | Modak | B60L 58/12 |
| | | | 701/22 |
| 2023/0242107 A1* | 8/2023 | Noma | B60W 30/0956 |
| | | | 701/23 |
| 2023/0256958 A1* | 8/2023 | Lee | B60W 40/02 |
| | | | 701/41 |

FOREIGN PATENT DOCUMENTS

| | | |
|---|---|---|
| JP | 2010-210271 A | 9/2010 |
| JP | 2011-215058 A | 10/2011 |
| JP | 2012-112828 A | 6/2012 |
| JP | 2013-40814 A | 2/2013 |
| JP | 2013-46494 A | 3/2013 |
| JP | 2015-083938 A | 4/2015 |
| JP | 2015-161604 A | 9/2015 |
| JP | 2017-182263 A | 10/2017 |

OTHER PUBLICATIONS

Office Action issued in corresponding Chinese Patent Application No. 201980031800.0, with English Machine Translation dated Nov. 13, 2023 (19 pages).

* cited by examiner

VEHICLE CONTROL DEVICE, VEHICLE CONTROL CENTER, AND PARKING ASSISTANCE SYSTEM

TECHNICAL FIELD

The present disclosure relates to a vehicle control device, a vehicle control center, and a parking assistance system.

BACKGROUND ART

Conventionally, inventions relevant to an automatic valet parking apparatus and method that enables a vehicle to be automatically parked in a vacant space and parked in the vicinity of a facility user's exit location from the facility have been known (refer to the following PTL 1).

PTL 1 discloses an automatic valet parking apparatus for operating a vehicle in a parking lot attached to a facility. This conventional automatic valet parking apparatus includes a parking lot map database, a vacant space information database, a facility tour information database, first means, second means, and third means. (refer to claim 1 and the like in the same document).

The parking lot map database manages information of a route to each parking space in the parking lot. The vacant space information database manages full/empty information for each parking space. The facility tour information database stores facility tour information indicating the behavior of a parking lot user in the facility.

The first means detects full information for each parking space, searches for a route to the parking space, and automatically parks the vehicle in the parking space based on the information of the route to the searched parking location.

The second means notifies the parking lot user of parking location information through a mobile terminal. The third means searches for a vacant space as close as possible to the conditions based on the facility tour information of the parking lot user, and reflects the result in the first means.

In this conventional invention, a vacant space is searched for and automatic parking is performed based on the current location and usage purpose information of the parking lot user. In addition, in the embodiment of this conventional invention, it is determined whether or not drop-off is possible on the road around the parking lot and the internal passage, and the parking lot user is notified of the result. Therefore, when the parking lot user returns home after wandering around the facility, the parking lot user can board the parked vehicle from the vicinity of the current location, and as a result, the convenience of the parking lot is improved (refer to paragraph 0009 and the like in the same document).

CITATION LIST

Patent Literature

PTL 1: JP 2017-182263 A

SUMMARY OF INVENTION

Technical Problem

For example, with an increase in the number of large-scale suburban commercial facilities, the number of large-scale parking lots with a larger site area than before is increasing. In such a large-scale parking lot, the traveling distance of the vehicle in the parking lot becomes longer than before. In addition, depending on the congestion situation of the parking lot, vehicles traveling in the parking lot may be temporarily stopped or travel at low speed, or vehicle congestion may occur. For this reason, if the remaining amount of fuel or charge for driving the vehicle, that is, the remaining amount of energy for driving the vehicle is insufficient, the vehicle may become stuck in the parking lot to interfere with the entry and exit of other vehicles. Such a problem due to insufficient energy remaining in the vehicle can be a particularly big problem in automatic valet parking in which vehicles are automatically driven and parked unmanned.

The present disclosure provides a vehicle control device, a vehicle control center, and a parking assistance system capable of avoiding the above problem due to insufficient energy remaining in a vehicle in a parking lot.

Solution to Problem

An aspect of the present disclosure is a vehicle control device that controls a vehicle entering and exiting a parking location of a parking lot. The vehicle control device includes: a remaining energy amount calculation unit that calculates a remaining amount of energy for driving the vehicle; a parking lot information acquisition unit that acquires map information and other vehicles information of the parking lot; a prediction unit that predicts a traveling speed and a movement time of the vehicle at the time of entry and exit based on the map information and the other vehicles information; a required energy amount calculation unit that calculates a required amount of energy for entry and exit of the vehicle based on the traveling speed and the movement time; and a parking determination unit that determines parking availability of the vehicle based on the remaining amount of energy and the required amount of energy.

Advantageous Effects of Invention

According to the above aspect of the present disclosure, it is possible to provide a vehicle control device capable of avoiding a problem due to insufficient traveling energy of a vehicle in a parking lot.

DESCRIPTION OF EMBODIMENTS

Hereinafter, embodiments of a vehicle control device, a vehicle control center, and a parking assistance system according to the present disclosure will be described with reference to the diagrams.

First Embodiment

Figure 1:
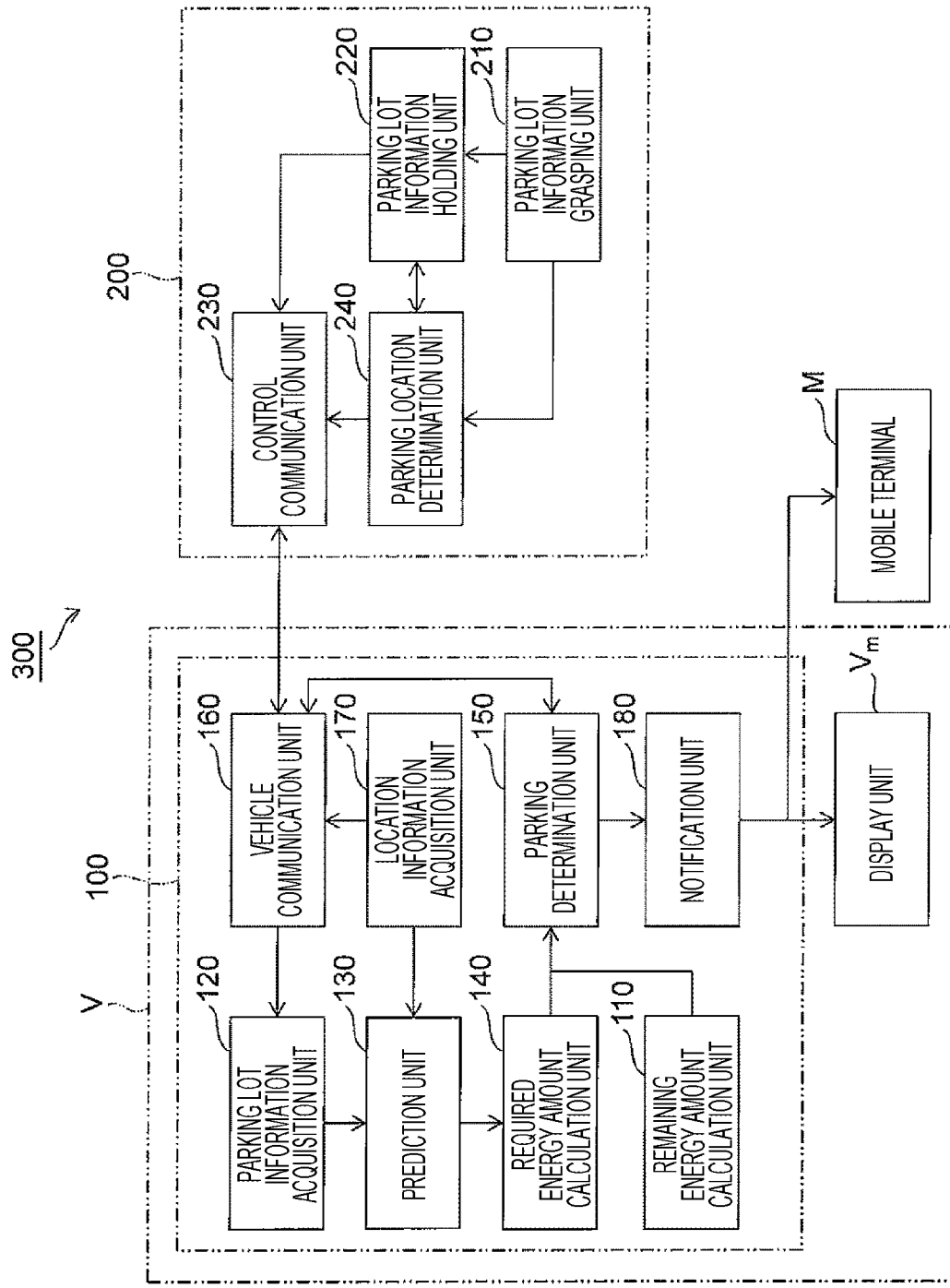
FIG. 1 is a block diagram of a parking assistance system according to a first embodiment.
Figure 2:
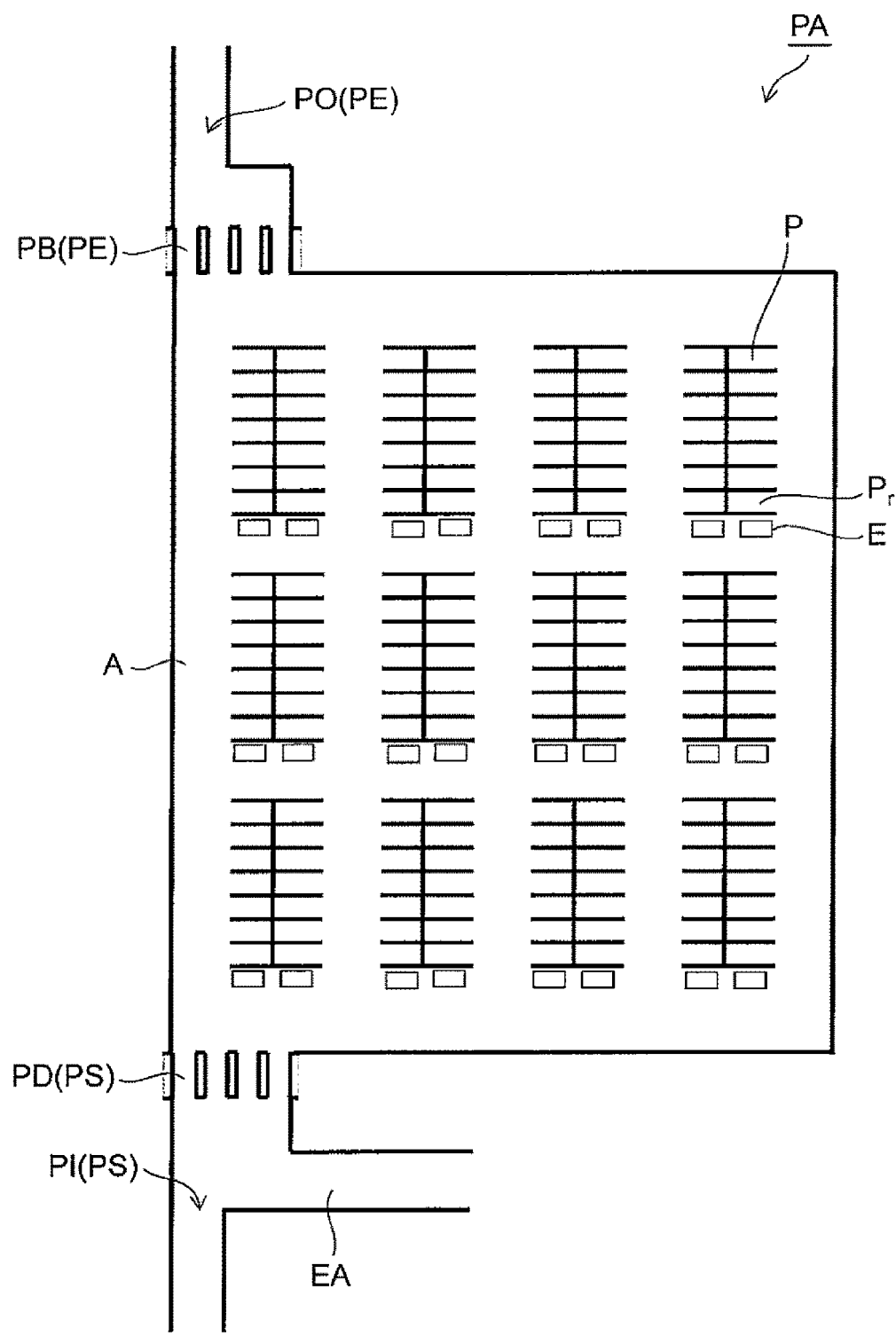
FIG. 2 is a plan view illustrating an example of a parking lot.

FIG. 1 is a block diagram illustrating a schematic configuration of a parking assistance system 300 according to a first embodiment. FIG. 2 is a plan view illustrating an example of a parking lot PA. The parking assistance system 300 of the present embodiment includes a vehicle control device 100 mounted in a vehicle V and a vehicle control center 200 that manages the vehicle V. In addition, in FIG. 1, only one vehicle V in which the vehicle control device 100 is mounted is illustrated, and other vehicles are not illustrated. That is, the vehicle control center 200 is configured to manage a plurality of other vehicles, in which vehicle control devices similar to the vehicle control device 100 are mounted, and plurality of other vehicles not including the vehicle control device 100.

Although the details will be described later, the vehicle control device 100 of the present embodiment has the following main features. The vehicle control device 100 is a device that controls the vehicle V entering and exiting a parking location P of the parking lot PA, and is, for example, a part of an electronic control unit (ECU) of the vehicle V. The vehicle control device 100 includes a remaining energy amount calculation unit 110, a parking lot information acquisition unit 120, a prediction unit 130, a required energy amount calculation unit 140, and a parking determination unit 150. The remaining energy amount calculation unit 110 calculates the remaining amount of energy Er for driving the vehicle. The parking lot information acquisition unit 120 acquires map information and other vehicles information of the parking lot PA.

The prediction unit 130 predicts the traveling speed and the movement time of the vehicle V at the time of entry and exit based on the acquired map information and other vehicles information. The required energy amount calculation unit 140 calculates the required amount of energy En for entry and exit of the vehicle V based on the predicted traveling speed and movement time. The parking determination unit 150 determines whether or not the vehicle V can be parked based on the remaining amount of energy Er and the required amount of energy En that have been calculated.

Hereinafter, the configuration of each unit of the vehicle control device 100 and the vehicle control center 200 of the present embodiment will be described in detail. The vehicle control device 100 of the present embodiment includes a vehicle communication unit 160, a location information acquisition unit 170, and a notification unit 180 in addition to the remaining energy amount calculation unit 110, the parking lot information acquisition unit 120, the prediction unit 130, the required energy amount calculation unit 140, and the parking determination unit 150 described above. The respective units of the vehicle control device 100 are connected to each other by a local area network (LAN), for example, a controller area network (CAN) or Ethernet (registered trademark).

In addition, the vehicle V, which is a control target of the vehicle control device 100 of the present embodiment, is a non-automated driving vehicle that is driven by the occupant himself or herself. The vehicle V has, for example, a display unit Vm for displaying various kinds of information for the occupant. The display unit Vm includes, for example, a touch panel, and also functions as an input unit for inputting information. In addition, the occupant of the vehicle V has, for example, a mobile terminal N that can be connected to the vehicle control device 100 or the vehicle control center 200.

For example, when the energy for the vehicle V to travel is extracted from fuels such as gasoline, light oil, natural gas, methanol, and hydrogen, the remaining energy amount calculation unit 110 calculates the remaining amount of energy Er for driving the vehicle V based on the signal of a fuel gauge that measures the remaining amount of fuel. In addition, for example, when the energy for the vehicle V to travel is extracted from a battery such as a lithium ion secondary battery, the remaining energy amount calculation unit 110 calculates the remaining amount of energy Er based on the charge rate of the battery or the amount of power stored in the battery. In addition, for example, when the vehicle V uses the fuel and the battery together, the remaining energy amount calculation unit 110 calculates the remaining amount of energy Er based on the amount of power or the charge rate of the battery and the remaining amount of the fuel. In addition, when the vehicle V includes a battery using an electrolytic solution, the battery capacity decreases at a low temperature. Therefore, the remaining energy amount calculation unit 110 may calculate the remaining amount of energy Er using the outside temperature acquired from a thermometer, for example.

The parking lot information acquisition unit 120 acquires and holds parking lot information including the map information and the other vehicles information of the parking lot PA received by the vehicle communication unit 160, for example. The map information of the parking lot PA is held, for example, in a parking lot information holding unit 220 of the vehicle control center 200. In addition, the other vehicles information of the parking lot PA is grasped by a parking lot information grasping unit 210 of the vehicle control center 200 and held in the parking lot information holding unit 220, for example. In addition, the parking lot information includes the parking location P of the vehicle V determined by a parking location determination unit 240 of the vehicle control center 200.

Here, as illustrated in FIG. 2, the map information of the parking lot PA is, for example, information of the widths, lengths, and shapes of a plurality of passages A in the parking lot PA or information of a plurality of parking locations P, which are spaces partitioned by white lines or the like for parking the vehicle V.

In addition, the other vehicles information of the parking lot PA includes, for example, information such as the locations, speeds, and traveling directions of other vehicles in the parking lot PA, or information such as entering, parking, exiting, entry scheduled, or exit scheduled.

The prediction unit 130 predicts the traveling speed and the movement time or the traveling distance of the vehicle V at the time of entry and exit based on the map information and the other vehicles information of the parking lot PA acquired by the parking lot information acquisition unit 120. That is, the prediction unit 130 predicts the traveling speed and the movement time or the traveling distance of the vehicle V at the time of entry and exit, for example, based on the information of the parking lot PA including the situation of the parking location P such as occupied or unoccupied, the number and flow of other vehicles traveling along the passage A, and the degree of congestion of other vehicles. In other words, the prediction unit 130 may predict the traveling speed and the movement time including the waiting time or the traveling distance of the vehicle V from a predetermined entry start location PS to a predetermined parking location P of the vehicle V based on the information received from the vehicle control center 200 in consideration of the congestion state of the passage A in the parking lot PA and the like.

Here, the movement time predicted by the prediction unit 130 includes, for example, an entry time until entering the predetermined parking location P from the predetermined entry start location PS and an exit time until exiting from the predetermined parking location P to a predetermined exit completion location PE. In addition, the traveling speed predicted by the prediction unit 130 changes, for example, from the start to the end of the movement time. That is, the vehicle V may travel at low speed or temporarily stop depending on the congestion situation of the parking lot PA and the shape of the passage A. Therefore, the traveling speed of the vehicle V predicted by the prediction unit 130 includes, for example, zero, and changes based on the map information and the other vehicles information of the parking lot PA.

In addition, when the traveling speed predicted by the prediction unit 130 includes zero, the movement time predicted by the prediction unit 130 includes a waiting time for which a state in which the vehicle V is temporarily stopped is maintained. In addition, for example, the parking lot information acquisition unit 120 may receive the map information, current other vehicles information, and past other vehicles information of the parking lot PA, which are held in the parking lot information holding unit 220, from the vehicle control center 200 through the vehicle communication unit 160. In this case, the prediction unit 130 may predict the entry time based on the map information and the current other vehicles information of the parking lot PA, and predict the exit time based on the map information of the parking lot PA and past other vehicles information that best matches the date and time when the vehicle V exits.

In addition, when the vehicle control device 100 includes the location information acquisition unit 170 that acquires the location information of the vehicle V, such as a global positioning system (GPS), the prediction unit 130 can refer to the location information acquired the location information acquisition unit 170. Specificall for example, referring to the current location information of the vehicle V acquired by the location information acquisition unit 170, the prediction unit 130 starts predicting the traveling speed and the movement time of the vehicle V at the time of entry and exit at the arbitrary entry start location PS in a range from the outside of the parking lot PA to the entrance PI of the parking lot PA. In addition, the prediction unit 130 may perform a more detailed calculation than usual when the remaining amount of energy Er is less than a predetermined value.

The required energy amount calculation unit 140 calculates the required amount of energy En for entry and exit of the vehicle based on the traveling speed and the movement time or the traveling distance of the vehicle V at the time of entry and exit predicted by the prediction unit 130. For example, when the energy for the vehicle V to travel is extracted from the fuel as described above, the required energy amount calculation unit 140 can calculate the required amount of energy En as the amount of fuel required for entry and exit of the vehicle. In addition, when the energy for the vehicle V to travel is extracted from the battery, the required energy amount calculation unit 140 may calculate the required amount of energy En as the amount of power or the charge rate of the battery required for entry and exit of the vehicle.

In addition, when the vehicle control device 100 includes the location information acquisition unit 170, the required energy amount calculation unit 140 may calculate the required amount of energy En for entry and exit of the vehicle V from the entry start location PS to the exit PO of the parking lot PA, which is the exit completion location PE, through the parking location P, for example. In addition, for example, when the destination of the vehicle V after exiting the parking lot PA is determined, the required energy amount calculation unit 140 may calculate the required amount of energy En for moving the vehicle V from the entry start location PS to a destination outside the parking lot PA, which is the exit completion location PE, through the parking location P and the exit PO of the parking lot PA.

The parking determination unit 150 determines whether or not the vehicle V can be parked based on the remaining amount of energy Er calculated by the remaining energy amount calculation unit 110 and the required amount of energy En calculated by the required energy amount calculation unit 140. More specifically, the parking determination unit 150 determines that parking is possible when the remaining amount of energy Er is equal to or greater than the required amount of energy En, and determines that parking is not possible when the remaining amount of energy Er is less than the required amount of energy En. The parking determination unit 150 transmits the parking availability determination result to the vehicle control center 200 through the vehicle communication unit 160, for example.

Here, in the example illustrated in FIG. 2, the parking lot PA has a supply location Pr where energy can be supplied to the vehicle V. The parking lot PA includes, for example, an energy supply facility E provided adjacent to the supply location Pr. The energy supply facility E includes, for example, a fuel supply facility capable of supplying a fuel to the fuel tank of the vehicle V, a charging facility capable of charging the battery of the vehicle V, and the like.

Thus, when the parking lot PA has the supply location Pr where energy can be supplied to the vehicle V, the prediction unit 130 may predict the traveling speed and the movement time or the traveling distance of the vehicle V at the time of entering the supply location Pr. In addition, the required energy amount calculation unit 140 may calculate the amount of energy for entry El based on the traveling speed and the movement time of the vehicle V at the time of entering the supply location Pr. In addition, the parking determination unit 150 may determine whether or not the vehicle V can be parked based on the remaining amount of energy Er and the amount of energy for entry El.

More specifically, even when the parking lot PA has the supply location Pr, the parking determination unit 150 determines that parking is possible if the remaining amount of energy Er is equal to or greater than the required amount of energy En. In addition, the parking determination unit 150 determines that parking is possible conditionally when the remaining amount of energy Er is less than the required amount of energy En and equal to or greater than the amount of energy for entry El. In addition, the parking determination unit 150 determines that parking is not possible when the remaining amount of energy Er is less than the amount of energy for entry El.

The vehicle communication unit 160 includes, for example, a radio communication device, and communicates with a control communication unit 230 of the vehicle control center 200 for transmission of information between the vehicle control device 100 and the vehicle control center 200. For example, the location information acquisition unit 170 acquires location information including the current location of the vehicle V based on the map information of the parking lot PA acquired by the parking lot information acquisition unit 120, information acquired from a camera or various sensors mounted in the vehicle V, and the like in addition to the GPS described above.

The notification unit 180 transmits the parking availability determination result of the parking determination unit 150 so as to be displayed on the display unit Vm of the vehicle V or the mobile terminal M of the occupant of the vehicle V. The notification unit 180 is connected to the display unit Vm of the vehicle V through, for example, a CAN or a LAN, and is connected to the mobile terminal M of the occupant by radio communication, such as Bluetooth (registered trademark).

The vehicle control center 200 is a facility for managing a plurality of vehicles including the vehicle V entering and exiting the parking location P of the parking lot PA. The vehicle control center 200 includes, for example, the parking lot information grasping unit 210, the parking lot information holding unit 220, the control communication unit 230, and the parking location determination unit 240. Each unit of the vehicle control center 200 can be mounted as an application on a computer, such as a server.

The parking lot information grasping unit 210 grasps, for example, other vehicles information of the parking lot PA. Here, as described above, the other vehicles information includes, for example, information such as the locations, speeds, and traveling directions of other vehicles in the parking lot PA, or information such as entering, parking, exiting, entry scheduled, or exit scheduled. For example, the parking lot information grasping unit 210 grasps other vehicles information based on images from a plurality of surveillance cameras installed in the parking lot PA, information acquired from sensors that detect the presence or absence of a parked vehicle at each parking location P, information of other vehicles traveling in the parking lot PA acquired by the control communication unit 230, and the like.

The parking lot information holding unit 220 includes, for example, a storage device such as a hard disk, and holds the map information of the parking lot PA and the other vehicles information grasped by the parking lot information grasping unit 210. In addition, for example, the parking lot information holding unit 220 may accumulate past other vehicles information, or may include a database that enables searching for past other vehicles information according to conditions such as month, day of the week, time, date and time, weather, and temperature. The control communication unit 230 includes, for example, a radio communication device, and performs radio communication with the vehicle communication unit 160 of the vehicle control device 100 mounted in the vehicle V. In addition, the control communication unit 230 may be provided so as to be able to communicate with the mobile terminal M of the occupant of the vehicle V, for example.

The parking location determination unit 240 determines the parking location P of the vehicle V based on, for example, the map information held by the parking lot information holding unit 220 and the other vehicles information grasped by the parking lot information grasping unit 210. For example, the parking location determination unit 240 may determine the travel route of the vehicle V to the determined parking location P. For example, t parking location determination unit 240 holds the determined parking location P and travel route in the parking lot information holding unit 220, and transmits the determined parking location P and travel route to the vehicle communication unit 160 of the vehicle control device 100 through the control communication unit 230.

Figure 3:
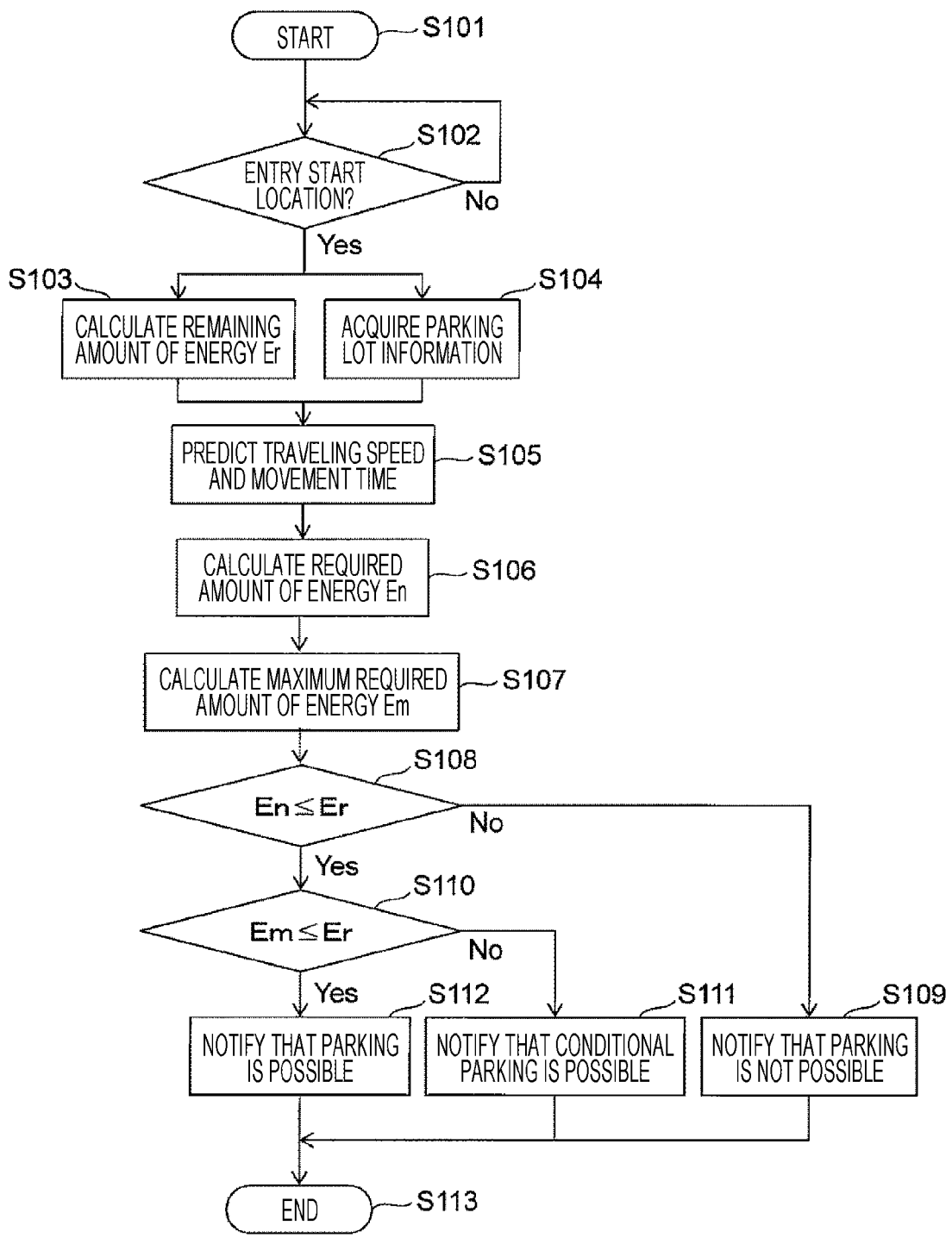
FIG. 3 is a flowchart illustrating an example of the operation of the parking assistance system illustrated in FIG. 1.

Hereinafter, the operation of the parking assistance system 300 of the present embodiment will be described. FIG. 3 is a flowchart illustrating an example of the operation of the parking assistance system 300 illustrated in FIG. 1.

For example, when the occupant of the vehicle V in which the vehicle control device 100 is mounted starts driving the vehicle V, the control of the vehicle V by the vehicle control device 100 configuring the parking assistance system 300 is started (step S101). Then, the location information acquisition unit 170 acquires the location information of the vehicle V, and determines whether or not the vehicle V is located at the predetermined entry start location PS (step S102).

In the vehicle control device 100, the predetermined entry start location PS can be set to, for example, an arbitrary location in a range from the current location of the vehicle V outside the parking lot PA to the entrance PI of the parking lot PA, as described above. Here, an example will be described in which the entry start location PS is set at the entrance PI of the parking lot PA in the vehicle control device 100.

As a result of the determination of the location information acquisition unit 170 (step S102), when the vehicle V has not arrived at the predetermined entry start location PS (No), the location information acquisition unit 170 repeats the determination (step S102) at predetermined periods, for example. When the vehicle V arrives at the entrance PI of the parking lot PA by the driving of the occupant, it is determined in the determination (step S102) of the location information acquisition unit 170 that the vehicle V is located at the predetermined entry start location PS (Yes).

Then, at the entry start location PS, the remaining amount of energy Er for driving the vehicle V is calculated by the remaining energy amount calculation unit 110 (step S103), and the location information acquisition unit 170 transmits the location information of the vehicle V to the vehicle control center 200 through the vehicle communication unit 160. In addition, the transmission of the location information of the vehicle V by the location information acquisition unit 170 may be performed after the end of the process of calculating the remaining amount of energy Er by the remaining energy amount calculation unit 110.

The vehicle control center 200 receives the location information of the vehicle V transmitted from the vehicle control device 100 using the control communication unit 230. Then, the vehicle control center 200 transmits parking lot information, which includes the other vehicles information of the parking lot PA grasped by the parking lot information grasping unit 210 and the map information of the parking lot PA held in the parking lot information holding unit 220, to the vehicle control device 100 using the control communication unit 230.

In the vehicle control device 100, the parking lot information including the other vehicles information and the map information transmitted from the vehicle control center 200 is received by the vehicle communication unit 160 at the entry start location PS and acquired by the parking lot information acquisition unit 120 (step S104). Then, in the vehicle control device 100, based on the acquired parking lot information, the traveling speed and the movement time of the vehicle V are predicted by the prediction unit 130 (step S105). At this time, the prediction unit 130 may predict the traveling distance of the vehicle V based on the acquired parking lot information.

More specifically, in the vehicle control device 100 of the present embodiment, the entry start location PS where the vehicle V starts entering the parking lot PA is set, for example, at the entrance PI of the parking lot PA, and the exit completion location PE where the vehicle V completes exiting the parking lot PA is set, for example, at the exit PO of the parking lot PA. In this case, the prediction unit 130 predicts the traveling speed and the movement time or the traveling distance of the vehicle V for moving the vehicle V to enter and exit the parking lot PA from the entrance PI of the parking lot PA, which is the entry start location PS, to the exit PO of the parking lot PA, which is the exit completion location PE, through the arbitrary parking location P in the unoccupied state (step S105).

Here, there is a case where there are a plurality of unoccupied parking locations P where parking is possible in the parking lot PA and there are a plurality of routes for arriving at each parking location P where parking is possible. In this case, for example, the prediction unit 130 may predict a plurality of traveling speeds and movement times or traveling distances of the vehicle V for entry and exit of the vehicle V corresponding to a plurality of routes to a plurality of parking locations P where parking is possible (step S105).

Then, based on the traveling speed and the movement time or the traveling distance of the vehicle V predicted by the prediction unit 130, the vehicle control device 100 calculates the required amount of energy En using the required energy amount calculation unit 140 (step S106). As described above, the prediction unit 130 may predict a plurality of traveling speeds and movement times or traveling distances of the vehicle V. In this case, t required energy amount calculation unit 140 calculates the required amount of energy En for each of the traveling speeds, movement times, or traveling distances (step S106).

As described above, the required energy amount calculation unit 140 may calculate a plurality of required amounts of energy En for a plurality of parking locations P. In this case, the required energy amount calculation unit 140 calculates the maximum required amount of energy En, among the plurality of required amounts of energy En, as a maximum required amount of energy Em (step S107). At this time, the required energy amount calculation unit 140 may calculate the minimum value of the plurality of required amounts of energy En as the required amount of energy En of the vehicle V.

On the other hand, there is also a case where the parking location P of the vehicle V is determined in advance by the vehicle control center 200 or a case where the prediction unit 130 predicts a single traveling speed and movement time or traveling distance depending on the availability of the parking lot PA or the like (step S105). In this case, the required energy amount calculation unit 140 calculates a single required amount of energy En (step S106). In this case, the calculation of the maximum required amount of energy Em (step S107) can be omitted.

Then, in the vehicle control device 100, the parking determination unit 150 determines whether or not parking is possible based on the remaining amount of energy Er calculated by the remaining energy amount calculation unit 110 and the required amount of energy En calculated by the required energy amount calculation unit 140 (step S108). Specifically, for example, when the required amount of energy En is larger than the remaining amount of energy Er (No), the parking determination unit 150 determines that parking is not possible. Then, the parking determination unit 150 notifies at least one of the display unit Vm of the vehicle V and the mobile terminal M of the occupant of the vehicle V that parking is not possible, which is the determination result, through the notification unit 180 so that the determination result is displayed (step S109). Thereafter, the vehicle control device 100 ends the control (step S113).

In this case, according to the determination of parking impossible notified and displayed on at least one of the display unit Vm of the vehicle V and the mobile terminal N, the occupant of the vehicle V drives the vehicle V to evacuate from an evacuation passage EA without parking the vehicle V in the parking lot PA, and supplies fuel or charges the battery. As a result, a situation in which the vehicle V becomes stuck in the parking lot PA to interfere with the entry and exit of other vehicles is prevented.

In addition, in the determination of parking availability (step S108), when the required amount of energy En is equal to or less than the remaining amount of energy Er (Yes) and the maximum required amount of energy Em is calculated, the parking determination unit 150 performs next determination. The parking determination unit 150 determines the presence or absence of parking conditions based on the remaining amount of energy Er and the maximum required amount of energy Em (step S110).

Specifically, for example, when the maximum required amount of energy Em is larger than the remaining amount of energy Er (No), the parking determination unit 150 determines that there are parking conditions. In addition, the parking determination unit 150 selects, for example, the parking location P where the vehicle V having the remaining amount of energy Er can enter and exit, and the vehicle communication unit 160 transmits information of the selected parking location P and the travel route to the vehicle control center 200.

The vehicle control center 200 receives the information of the parking location P and the travel route allowing the vehicle V to enter and exit, which is transmitted from the vehicle control device 100, using the control communication unit 230, and holds the information in the parking lot information holding unit 220. Based on the parking location P and the travel route allowing the vehicle V to enter and exit and the map information and other vehicles information of the parking lot PA, which are held in the parking lot information holding unit 220, the vehicle control center 200 determines the parking location P and the travel route of the vehicle V using the parking location determination unit 240. The vehicle control center 200 transmits the information of the determined parking location P to the vehicle control device 100 through the control communication unit 230.

The vehicle control device 100 receives the parking location P and the travel route determined by the vehicle control center 200 using the vehicle communication unit 160. The parking determination unit 150 notifies at least one of the display unit Vm of the vehicle V and the mobile terminal M of the occupant of the vehicle V of the parking location P and the travel route received by the vehicle communication unit 160 and conditional parking, which is the determination result, using the notification unit 180 so that these are displayed (step S111). Thereafter, the vehicle control device 100 ends the control (step S113).

In this case, according to the parking location P, the travel route, and the determination of conditional parking notified and displayed on at least one of the display unit Vm of the vehicle V and the mobile terminal M, the occupant of the vehicle V drives the vehicle V to be parked at the designated parking location P of the parking lot PA. Therefore, since the vehicle V can be parked at the parking location P where entry and exit are possible according to the remaining amount of energy Er of the vehicle V, a situation in which the vehicle V becomes stuck in the parking lot PA to interfere with the entry and exit of other vehicles is prevented.

In addition, in the determination of the presence or absence of parking conditions (step S110), when the maximum required amount of energy Em is equal to or less than the remaining amount of energy Er (Yes), the parking determination unit 150 determines that parking is possible. Then, the parking determination unit 150 notifies at least one of the display unit Vm of the vehicle V and the mobile terminal M of the occupant of the vehicle V that parking is possible, which is the determination result, through the notification unit 180 so that the determination result is displayed (step S112). Thereafter, the vehicle control device 100 ends the control (step S113).

In addition, in the determination of parking availability (step S108), there is also a case where the required amount of energy En is equal to or less than the remaining amount of energy Er (Yes) and the maximum required amount of energy Em is not calculated. In this case, the parking determination unit 150 omits the determination of the presence or absence of parking conditions (step S110) and determines that parking is possible, and notifies at least one of the display unit Vm of the vehicle V and the mobile terminal M of the occupant of the vehicle V that parking is possible, which is the determination result, through the notification unit 180 so that the determination result is displayed (step S112). Thereafter, the vehicle control device 100 ends the control (step S113).

In this case, the remaining amount of energy Er of the vehicle V is the amount of energy that allows the vehicle V to enter and exit the arbitrary parking location P along the arbitrary route in consideration of the congestion situation of the parking lot PA. Therefore, according to the determination of parking availability notified and displayed on at least one of the display unit Vm of the vehicle V and the mobile terminal M, the occupant of the vehicle V can drive the vehicle V to be parked at the arbitrary unoccupied parking location P of the parking lot PA.

In addition, as described above, when the parking lot PA has the supply location Pr where energy can be supplied to the vehicle V, the operation of the vehicle control device 100 after the calculation of the required amount of energy En (step S106) can be changed as follows.

Figure 4:
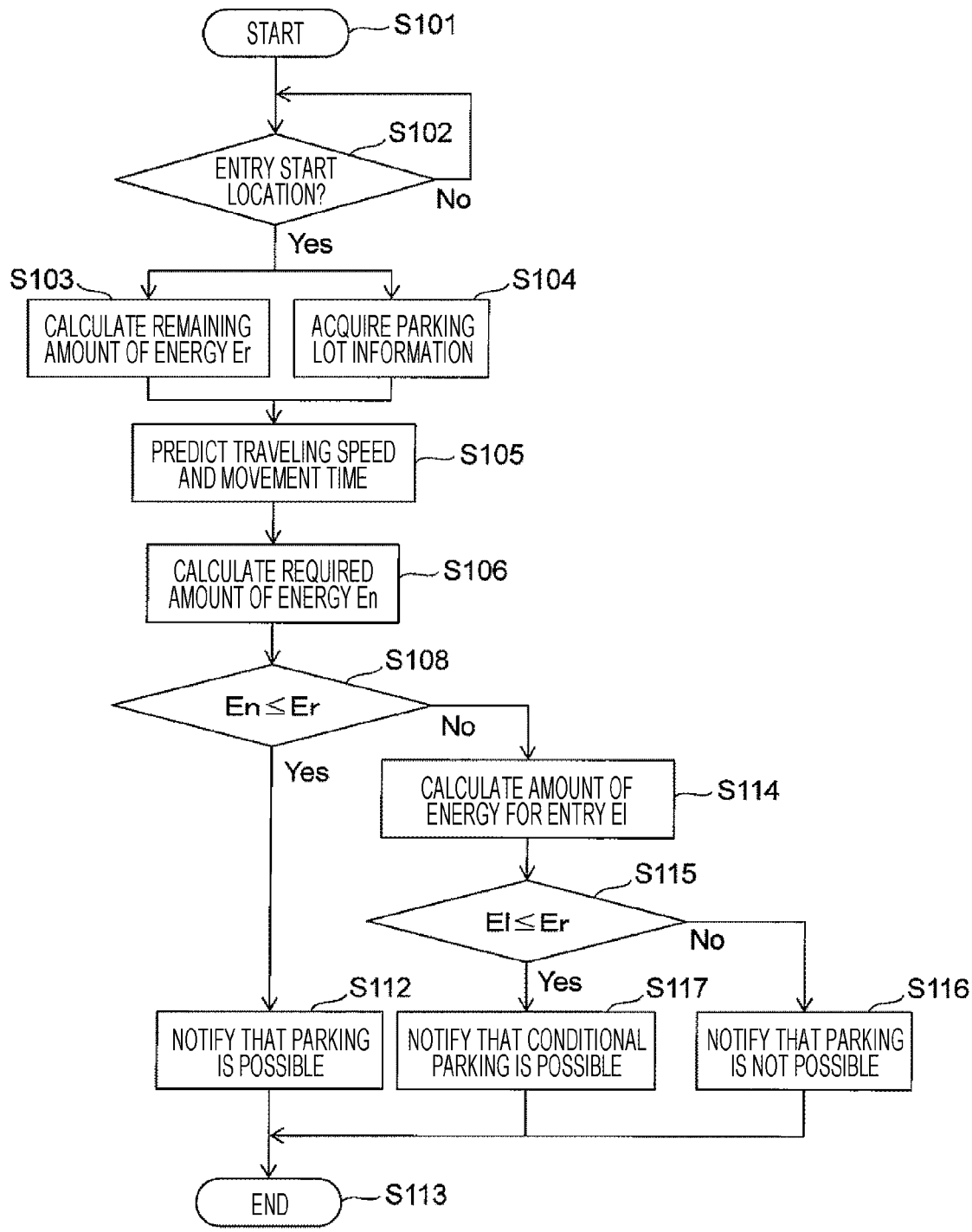
FIG. 4 is a flowchart illustrating an example of the operation of the parking assistance system illustrated in FIG. 1.

FIG. 4 is a flowchart illustrating an example of the operation of the vehicle control device 100 illustrated in FIG. 1. The operation of the vehicle control device 100 illustrated in FIG. 4 is the same as the operation of the vehicle control device 100 illustrated in FIG. 3 from the start of control (step S101) to the calculation of the required amount of energy En (step S106). After the calculation of the required amount of energy En by the required energy amount calculation unit 140 (step S106), the vehicle control device 100 determines whether or not parking is possible using the parking determination unit 150 as in the example illustrated in FIG. 3 (step S108).

In the determination of parking availability (step S108), when the parking determination unit 150 determines that the required amount of energy En is larger than the remaining amount of energy Er (No), the vehicle control device 100 calculates the amount of energy for entry El (step S114). More specifically, first, the prediction unit 130 predicts the traveling speed and the movement time or the traveling distance of the vehicle V at the time of entering the supply location Pr.

Then, the required energy amount calculation unit 140 calculates the amount of energy for entry El based on the traveling speed and the movement time of the vehicle V at the time of entering the supply location Pr.

Then, in the vehicle control device 100, the parking determination unit 150 determines whether or not the vehicle V can be parked at the supply location Pr based on the remaining amount of energy Er and the amount of energy for entry El (step S115). Specifically, the parking determination unit 150 determines that parking is not possible when the remaining amount of energy Er is less than the amount of energy for entry El (No). Then, the parking determination unit 150 notifies at least one of the display unit Vm of the vehicle V and the mobile terminal M of the occupant of the vehicle V that parking is not possible, which is the determination result, through the notification unit 180 so that the determination result is displayed (step S116). Thereafter, the vehicle control device 100 ends the control (step S113).

In this case, according to the determination of parking impossible notified and displayed on at least one of the display unit Vm of the vehicle V and the mobile terminal M, the occupant of the vehicle V drives the vehicle V to evacuate from an evacuation passage EA without parking the vehicle V in the parking lot PA, and supplies fuel or charges the battery. As a result, a situation in which the vehicle V becomes stuck in the parking lot PA to interfere with the entry and exit of other vehicles is prevented.

In addition, in the determination of parking availability (step S115), when the amount of energy for entry El is equal to or less than the remaining amount of energy Er (Yes), the parking determination unit 150 selects the supply location Pr where the vehicle V having the remaining amount of energy Er can enter, and the information of the selected supply location Pr and the travel route is transmitted to the vehicle control center 200 by the vehicle communication unit 160.

The vehicle control center 200 receives the information of the supply location Pr and the travel route allowing the vehicle V to enter, which is transmitted from the vehicle control device 100, using the control communication unit 230, and holds the information in the parking lot information holding unit 220. Based on the supply location Pr and the travel route allowing the vehicle V to enter and the map information and other vehicles information of the parking lot PA, which are held in the parking lot information holding unit 220, the vehicle control center 200 determines the supply location Pr and the travel route for parking the vehicle V using the parking location determination unit 240. The vehicle control center 200 transmits the information of the determined supply location Pr to the vehicle control device 100 through the control communication unit 230.

The vehicle control device 100 receives the supply location Pr and the travel route determined by the vehicle control center 200 using the vehicle communication unit 160. The parking determination unit 150 notifies at least one of the display unit Vm of the vehicle V and the mobile terminal M of the occupant of the vehicle V of the instruction of the supply location Pr, the travel route, and the energy supply received by the vehicle communication unit 160 and conditional parking, which is the determination result of parking availability, using the notification unit 180 so that these are displayed (step S117). Thereafter, the vehicle control device 100 ends the control (step S113).

In this case, according to the instruction of the supply location Pr, the travel route, and the energy supply and the determination of conditional parking that are notified and displayed on at least one of the display unit Vm of the vehicle V and the mobile terminal M, the occupant of the vehicle V drives the vehicle V to park the vehicle V at the designated supply location Pr of the parking lot PA, and supplies energy by supplying fuel to the vehicle V or charging the battery. In this manner, the vehicle V can be parked at the supply location Pr where the vehicle V can enter with the remaining amount of energy Er, and the vehicle V can exit after supplying energy by the energy supply facility E. Therefore, a situation in which the vehicle V becomes stuck in the parking lot PA to interfere with the entry and exit of other vehicles is prevented.

In addition, in the vehicle control center 200, the parking location determination unit 240 may further determine the parking location P for parking the vehicle V for which energy supply has been completed at the supply location Pr.

In this case, the vehicle control center 200 transmits the information of the determined parking location P after energy supply to the vehicle control device 100 through the control communication unit 230. The vehicle control device 100 receives the supply location Pr, the parking location P, and the travel route using the vehicle communication unit 160, and notifies at least one of the display unit Vm of the vehicle V and the mobile terminal M of the occupant of the vehicle V of the pieces of information and the determination result of conditional parking using the notification unit 180 so that these are displayed (step S117).

Thereafter, the vehicle control device 100 ends the control (step S113).

In this case, according to the instruction of the supply location Pr, the parking location P after energy supply, the travel route, and the energy supply and the determination of conditional parking that are notified and displayed on at least one of the display unit Vm of the vehicle V and the mobile terminal M, the occupant of the vehicle V drives the vehicle V to supply the energy of the vehicle V at the designated supply location Pr of the parking lot PA, and then moves to the parking location P to park the vehicle V. In this manner, the vehicle V can be parked after sufficient energy is supplied at the supply location Pr where the vehicle V can enter with the remaining amount of energy Er. Therefore, a situation in which the vehicle V becomes stuck in the parking lot PA to interfere with the entry and exit of other vehicles is prevented.

In addition, in the determination of parking availability (step S108), when the required amount of energy En is equal to or less than the remaining amount of energy Er (Yes), the parking determination unit 150 determines that parking is possible. Then, the parking determination unit 150 notifies at least one of the display unit Vm of the vehicle V and the mobile terminal M of the occupant of the vehicle V that parking is possible, which is the determination result, through the notification unit 180 so that the determination result is displayed (step S112). Thereafter, the vehicle control device 100 ends the control (step S113).

In addition, a case can be considered in which another vehicle parks at the parking location P where the vehicle V is about to park. In this case, in the vehicle control center 200, for example, the parking lot information grasping unit 210 grasps that another vehicle has parked at the parking location P of the vehicle V, the parking location determination unit 240 determines a plurality of new parking locations P of the vehicle V, and the control communication unit 230 transmits the plurality of new parking locations P to the vehicle control unit 100.

In the vehicle control unit 100, the parking lot information acquisition unit 120 acquires the information of the plurality of new parking locations P transmitted from the vehicle control center 200 through the vehicle communication unit 160, and the prediction unit 130 newly predicts the traveling speed and the movement time of the vehicle V up to each parking location P. In addition, in the vehicle control unit 100, the required energy amount calculation unit 140 calculates the required amount of energy En up to each parking location P, and the parking determination unit 150 determines whether or not parking at each parking location P is possible.

Specifically, the parking determination unit 150 determines that parking is not possible when the required amount of energy En up to each parking location P is larger than the remaining amount of energy Er. In addition, the parking determination unit 150 determines that parking is possible when the required amount of energy En up to each parking location P is equal to or less than the remaining amount of energy Er. Then, the notification unit 180 notifies at least one of the display unit Vm of the vehicle V and the mobile terminal M of the occupant of the vehicle V of the new parking location P, at which it has been determined that parking is possible by the parking determination unit 150, so that the new parking location P is displayed. Therefore, the occupant of the vehicle V can park the vehicle V at the new parking location P.

As described above, according to the present embodiment, since a situation in which the vehicle V becomes stuck in the parking lot PA to interfere with the entry and exit of other vehicles is prevented, it is possible to provide the vehicle control device 100 capable of avoiding the problem due to insufficient traveling energy of the vehicle V in the parking lot PA. In addition, the vehicle control device of the present disclosure is not limited to the configuration of the vehicle control device 100 according to the present embodiment illustrated in FIG. 1. Hereinafter, a modification example of the vehicle control device 100 of the present embodiment will be described.

Figure 5:
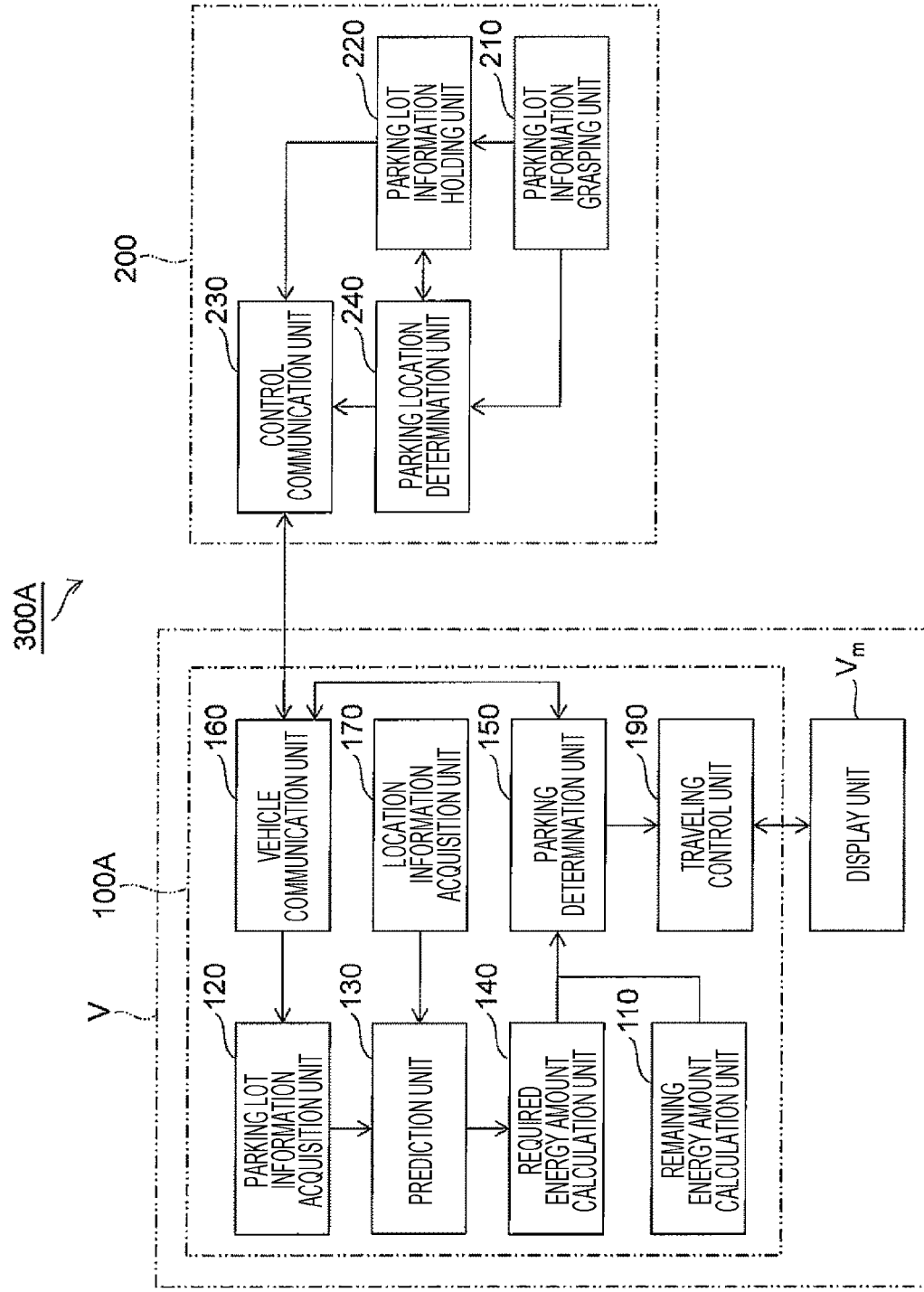
FIG. 5 is a block diagram illustrating a modification example of the parking assistance system illustrated in FIG. 1.

FIG. 5 is a block diagram illustrating a modification example of the parking assistance system 300 illustrated in FIG. 1. A parking assistance system 300A according to the modification example illustrated in FIG. 5 is different from the parking assistance system 300 illustrated in FIG. in that a vehicle control device 100A includes a traveling control unit 190 instead of the notification unit 180. Since the other points of the parking assistance system 300A of this modification example are the same as those of the parking assistance system 300 illustrated in FIG. 1, the same components are denoted by the same reference numerals, and the description thereof will be omitted.

The vehicle control device 100A of this modification example includes the traveling control unit 190 that makes a vehicle automatically driven based on the determination result of parking availability by the parking determination unit 150.

In this modification example, as illustrated in FIG. 2, the prediction unit 130 sets a drop-off location PD where the occupant gets out of the vehicle V or an entry instruction location, at which the occupant of the vehicle V gives an instruction to enter the parking lot PA to the traveling control unit 190, as the entry start location PS. Then, the prediction unit 130 starts predicting the traveling speed and the movement time of the vehicle at the time of entry and exit based on the map information and the other vehicles information acquired by the parking lot information acquisition unit 120 at the entry start location PS.

The vehicle control device 100A of this modification example is different from the 100 illustrated in FIG. 1 in the operation after the determination of parking availability (step S108) illustrated in FIG. 3. That is, in the vehicle control device 100A of this modification example, when it is determined that parking is not possible in the determination of parking availability (step S108), the traveling control unit 190 does not perform automated driving of the vehicle V and displays parking impossible, which is the determination result, on the display unit Vm of the vehicle V.

In this case, according to the determination of parking impossible displayed on the display unit Vm of the vehicle V, the occupant of the vehicle V drives the vehicle V to evacuate from an evacuation passage EA without parking the vehicle V in the parking lot PA, and supplies fuel or charges the battery. As a result, a situation in which the vehicle V becomes stuck in the parking lot PA to interfere with the entry and exit of other vehicles is prevented.

In addition, in the vehicle control device 100A of the modification example, when parkable or conditionally parkable is determined as described above in the determination of parking availability (step S108) and the determination of the presence or absence of parking conditions (step S110), the traveling control unit 190 operates as follows. The traveling control unit 190 causes the display unit Vm of the vehicle V to display the parking location P, the travel route, and the determination result transmitted from the vehicle control center 200 together with an automated driving start icon. In addition, the traveling control unit 190 may display the automated driving start icon or the like on the mobile terminal M of the occupant, similarly to the notification unit 180 illustrated in FIG. 1.

In this case, the occupant of the vehicle V taps the automated driving start icon displayed on the display unit Vm and gets out of the vehicle V at the drop-off location PD. Alternatively, the occupant of the vehicle V taps the automated driving start icon displayed on the mobile terminal M after getting out of the vehicle V at the drop-off location PD. Then, the automated driving of the vehicle V by the traveling control unit 190 is started, and the vehicle V automatically travels by the traveling control unit 190 so that the vehicle V is parked at the designated parking location P of the parking lot PA. Therefore, in automatic valet parking, since the vehicle V can be parked at the parking location P where entry and exit are possible according to the remaining amount of energy Er of the vehicle V, a situation in which the vehicle V becomes stuck in the parking lot PA to interfere with the entry and exit of other vehicles is prevented.

In addition, when the entry instruction location where the occupant of the vehicle V gives an instruction to enter the parking lot PA to the traveling control unit 190 is set as the entry start location PS, it is conceivable that a non-automated vehicle driven by an occupant is parked at the parking location P designated outside the parking lot PA by the vehicle control center 200. For this reason, at the entrance PI of the parking lot PA, the new parking location P may be transmitted again from the control communication unit 230 of the vehicle control center 200 to the vehicle communication unit 160 of the vehicle control device 100A mounted in the vehicle V.

In addition, as described above, the vehicle control device 100A of this modification example includes the traveling control unit 190 that makes the vehicle V automatically driven based on the determination result of parking availability by the parking determination unit 150. In this case, the required energy amount calculation unit 140 may be configured to calculate the required amount of energy En for entry and exit of the vehicle V from the entry start location PS of the vehicle V to a boarding location PB where the occupant gets on the vehicle V or an automated driving end location, at which automated driving by the traveling control unit 190 ends, through the parking location P. With this configuration, the vehicle V can be automatically driven from the entry start location PS to the boarding location PB or the automated driving end location outside the parking lot PA without being stuck.

Second Embodiment

Next, embodiments of a vehicle control center and a parking assistance system according to the present disclosure will be described with reference to FIGS. 2 to 4 and FIG. 6.

Figure 6:
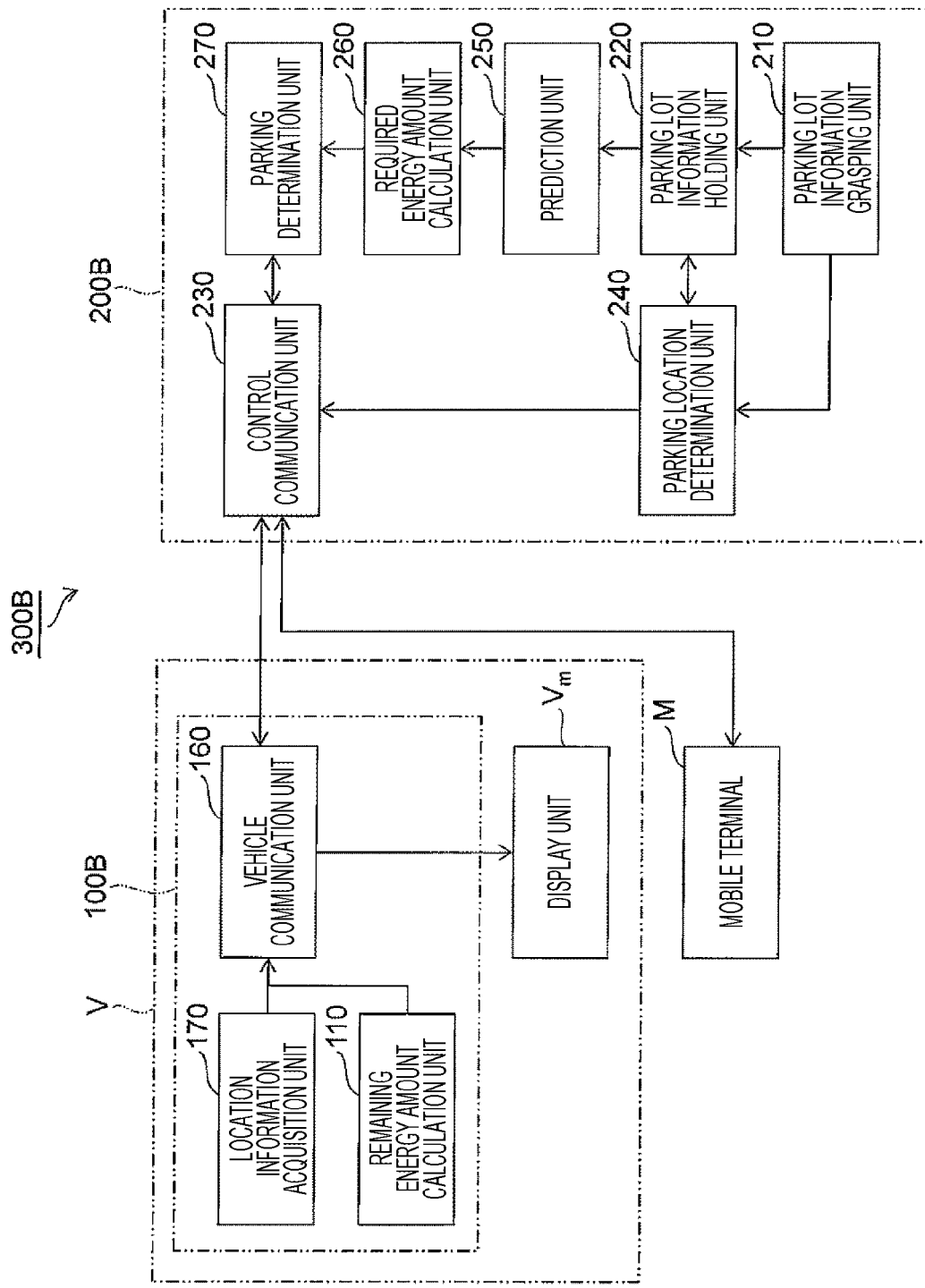
FIG. 6 is a block diagram of a parking assistance system according to a second embodiment.

FIG. 6 is a block diagram of a parking assistance system 300B according to a second embodiment. The parking assistance system 300B of the present embodiment is characterized by the configuration of a vehicle control center 200B. In addition, in the parking assistance system 300B of the present embodiment, the same components as in the parking assistance system 300 according to the first embodiment illustrated in FIG. 1 are denoted by the same reference numerals, and the description thereof will be omitted.

The vehicle control center 200B is a facility for managing the vehicle V entering and exiting the parking location P of the parking lot PA. The vehicle control center 200B includes a control communication unit 230, a parking lot information holding unit 220, a prediction unit 250, a required energy amount calculation unit 260, and a parking determination unit 270. The control communication unit 230 receives the remaining amount of energy Er for driving the vehicle V, which is calculated by a remaining energy amount calculation unit 110 of a vehicle control device 100E mounted in the vehicle V and transmitted from the vehicle communication unit 160. The parking lot information holding unit 220 holds map information and other vehicles information of the parking lot PA. The prediction unit 250 predicts the traveling speed and the movement time of the vehicle V at the time of entry and exit based on the map information and the other vehicles information. The required energy amount calculation unit 260 calculates the required amount of energy En for entry and exit of the vehicle V based on the traveling speed and the movement time. The parking determination unit 270 determines whether or not the vehicle V can be parked based on the remaining amount of energy Er and the required amount of energy En. Then, the control communication unit 230 transmits the determination result of parking availability to the display unit Vm of the vehicle V or the mobile terminal M that the occupant of the vehicle V has.

That is, in the parking assistance system 300B according to the present embodiment, the prediction unit 250, the required energy amount calculation unit 260, and the parking determination unit 270 of the vehicle control center 200B operate in the same manner as the prediction unit 130, the required energy amount calculation unit 140, and the parking determination unit 150 of the vehicle control device 100 according to the first embodiment.

That is, as illustrated in FIGS. 3 and 4, the prediction of the traveling speed and the movement time of the vehicle V (step S104) and the calculation of the required amount of energy En (step S106) are performed by the prediction unit 250 and the required energy amount calculation unit 260 of the vehicle control center 200, respectively. In addition, the calculation of the maximum required amount of energy Em (step S107) or the calculation of the amount of energy for entry El (step S114) are performed by the required energy amount calculation unit 260 of the vehicle control center 200. In addition, the determination of parking availability (steps S108, S110, and S115) is performed by the parking determination unit 270 of the vehicle control center 200.

Therefore, according to the present embodiment, since a situation in which the vehicle V becomes stuck in the parking lot PA to interfere with the entry and exit of other vehicles is prevented, it is possible to provide the vehicle control center 200B capable of avoiding the problem due to insufficient traveling energy of the vehicle V in the parking lot PA. In addition, the parking assistance system 300 according to the first embodiment described above and the parking assistance system 300B according to the present embodiment have the following configuration in common.

The parking assistance systems 300 and 300B include the vehicle control devices 100 and 100B that control the vehicle V entering and exiting the parking location P of the parking lot PA and the vehicle control centers 200 and 200B that manage the vehicle V. The vehicle control devices 100 and 100B include the remaining energy amount calculation unit 110 that calculates the remaining amount of energy Er for driving the vehicle V and a vehicle communication unit 160 that communicates with the vehicle control centers 200 and 200B. The vehicle control centers 200 and 200B include the parking lot information holding unit 220 that holds the map information and the other vehicles information of the parking lot PA and the control communication unit 230 that communicates with the vehicle V. In the parking assistance systems 300 and 300B, the vehicle control device 100 or the vehicle control center 200B includes the prediction units 130 and 250, the required energy amount calculation units 140 and 260, and the parking determination units 150 and 270.

The prediction units 130 and 250 predict the traveling speed and the movement time of the vehicle V at the time of entry and exit based on the map information and the other vehicles information of the parking lot PA. The required energy amount calculation units 140 and 260 calculate the required amount of energy En for entry and exit of the vehicle V based on the traveling speed and the movement time. The parking determination units 150 and 270 determine whether or not the vehicle V can be parked based on the remaining amount of energy Er and the required amount of energy En.

With this configuration, the parking assistance systems 300 and 300B can avoid the problem due to insufficient traveling energy of the vehicle V in the parking lot PA by preventing the situation in which the vehicle V becomes stuck in the parking lot PA to interfere with the entry and exit of other vehicles.

Although the embodiments of the present invention have been described in detail with reference to the diagrams, the specific configuration is not limited to these embodiments, and design changes and the like within a range not deviating from the gist of the present invention are also included in the present invention.

REFERENCE SIGNS LIST

100 vehicle control device
100A vehicle control device
100B vehicle control device
110 remaining energy amount calculation unit
120 parking lot information acquisition unit
130 prediction unit
140 required energy amount calculation unit
150 parking determination unit
170 location information acquisition unit
180 notification unit
190 traveling control unit
200 vehicle control center
200B vehicle control center
210 parking lot information grasping unit
220 parking lot information holding unit
230 control communication unit
250 prediction unit
260 required energy amount calculation unit
270 parking determination unit
300 parking assistance system
300A parking assistance system
300B parking assistance system
El amount of energy for entry
En required amount of energy
Er remaining amount of energy
M mobile terminal
P parking location
PA parking lot
PB boarding location
PD drop-off location
PI entrance
PO exit
Pr supply location
PS entry start location
V vehicle
Vm display unit

The invention claimed is:

1. A vehicle control device that controls a vehicle entering and exiting a parking location of a parking lot, comprising:
   a remaining energy amount calculation unit that calculates a remaining amount of energy for driving the vehicle;
   a parking lot information acquisition unit that acquires map information and other vehicles information of the parking lot from at least one of a camera located in the parking lot or a sensor of the vehicle;
   a prediction unit that predicts a plurality of traveling speeds and a plurality of movement times of the vehicle at the time of entry and exit based on the map information and the other vehicles information;
   a required energy amount calculation unit that calculates a required amount of energy for entry and exit of the vehicle based on each of the plurality of traveling speeds and each of the plurality of movement times; and
   a parking determination unit that determines parking availability of the vehicle based on the remaining amount of energy and the required amount of energy, wherein:
   the map information includes a parking location;
   the other vehicles information includes a location, a speed, and a state of the other vehicles in the parking lot;
   the prediction unit plans a travel route of the vehicle to the parking location, and predicts the traveling speed and the movement time of the vehicle in consideration of an influence of the other vehicles on the vehicle based on the other vehicles information; and
   the parking determination unit determines that parking is possible when the remaining amount of energy is greater than the required amount of energy.

2. The vehicle control device according to claim 1, further comprising:
   a location information acquisition unit that acquires location information of the vehicle,
   wherein the prediction unit starts the prediction at an arbitrary entry start location in a range from an outside of the parking lot to an entrance of the parking lot with reference to the location information.

3. The vehicle control device according to claim 2, wherein the required energy amount calculation unit calculates the required amount of energy for entry and exit of the vehicle from the entry start location to an exit of the parking lot through the parking location.

4. The vehicle control device according to claim 2, further comprising: a traveling control unit that makes the vehicle automatically driven based on a determination result of the parking availability,
   wherein the required energy amount calculation unit calculates the required amount of energy for entry and exit of the vehicle from the entry start location of the vehicle to a boarding location where an occupant gets on the vehicle or an automated driving end location, at which the automated driving by the traveling control unit ends, through the parking location.

5. The vehicle control device according to claim 1, further comprising:
   a traveling control unit that makes the vehicle automatically driven based on a determination result of the parking availability,
   wherein the prediction unit sets a drop-off location where an occupant gets out of the vehicle or an entry instruction location, at which the occupant of the vehicle gives an instruction to enter the parking lot to the traveling control unit, as an entry start location, and starts the prediction at the entry start location.

6. The vehicle control device according to claim 1, wherein, when the parking lot has a supply location where energy can be supplied to the vehicle, the prediction unit predicts a traveling speed and a movement time of the vehicle at the time of entering the supply location,
   the required energy amount calculation unit calculates an amount of energy for entry based on the traveling speed and the movement time of the vehicle at the time of entering the supply location, and
   the parking determination unit determines parking availability of the vehicle based on the remaining amount of energy and the amount of energy for entry.

7. The vehicle control device according to claim 6, wherein the parking determination unit determines that parking is conditionally possible when the remaining amount of energy is less than the required amount of energy and equal to or greater than the amount of energy for entry and determines that parking is not possible when the remaining amount of energy is less than the amount of energy for entry.

8. The vehicle control device according to claim 1, further comprising: a notification unit that transmits a determination result of the parking availability so as to be displayed on a display unit of the vehicle or a mobile terminal of an occupant of the vehicle.

9. A vehicle control center that manages a vehicle entering and exiting a parking location of a parking lot, comprising:
   a control communication network that receives a remaining amount of energy for driving the vehicle;
   a memory that stores map information and other vehicles information of the parking lot from at least one of a camera located in the parking lot of a sensor of the vehicle received via the control communication network; and
   one or more processors, that, in response to executing instructions stored on the memory:
      predict a plurality of traveling speeds and a plurality of movement times of the vehicle at the time of entry and exit based on the map information and the other vehicles information;
      calculate a required amount of energy for entry and exit of the vehicle based on each of the plurality of traveling speeds and each of the plurality of movement times; and
      determine parking availability of the vehicle based on the remaining amount of energy and the required amount of energy,
   wherein the control communication network transmits a determination result of the parking availability to a display device of the vehicle or a mobile terminal that an occupant of the vehicle has.

10. A parking assistance system, comprising:
   a vehicle control device that controls a vehicle entering and exiting a parking location of a parking lot; and
   a vehicle control center that manages the vehicle,
   wherein the vehicle control device includes one or more memory devices storing instructions thereon, that, when executed by one or more processors, cause the one or more processors to calculate a remaining amount of energy for driving the vehicle and a vehicle communication network that communicates with the vehicle control center,
   the vehicle control center includes one or more memory devices that store map information and other vehicles information of the parking lot from at least one of a camera located in the parking lot or a sensor of the vehicle received via a control communication network that communicates with the vehicle, and the vehicle control device or the vehicle control center includes a prediction unit that predicts a plurality of traveling speeds and a plurality of movement times of the vehicle at the time of entry and exit based on the map information and the other vehicles information, a required energy amount calculation unit that calculates a required amount of energy for entry and exit of the vehicle based on each of the plurality of traveling speeds and each of the plurality of movement times, and a parking determination unit that determines parking availability of the vehicle based on the remaining amount of energy and the required amount of energy.

* * * * *